Patented July 11, 1944

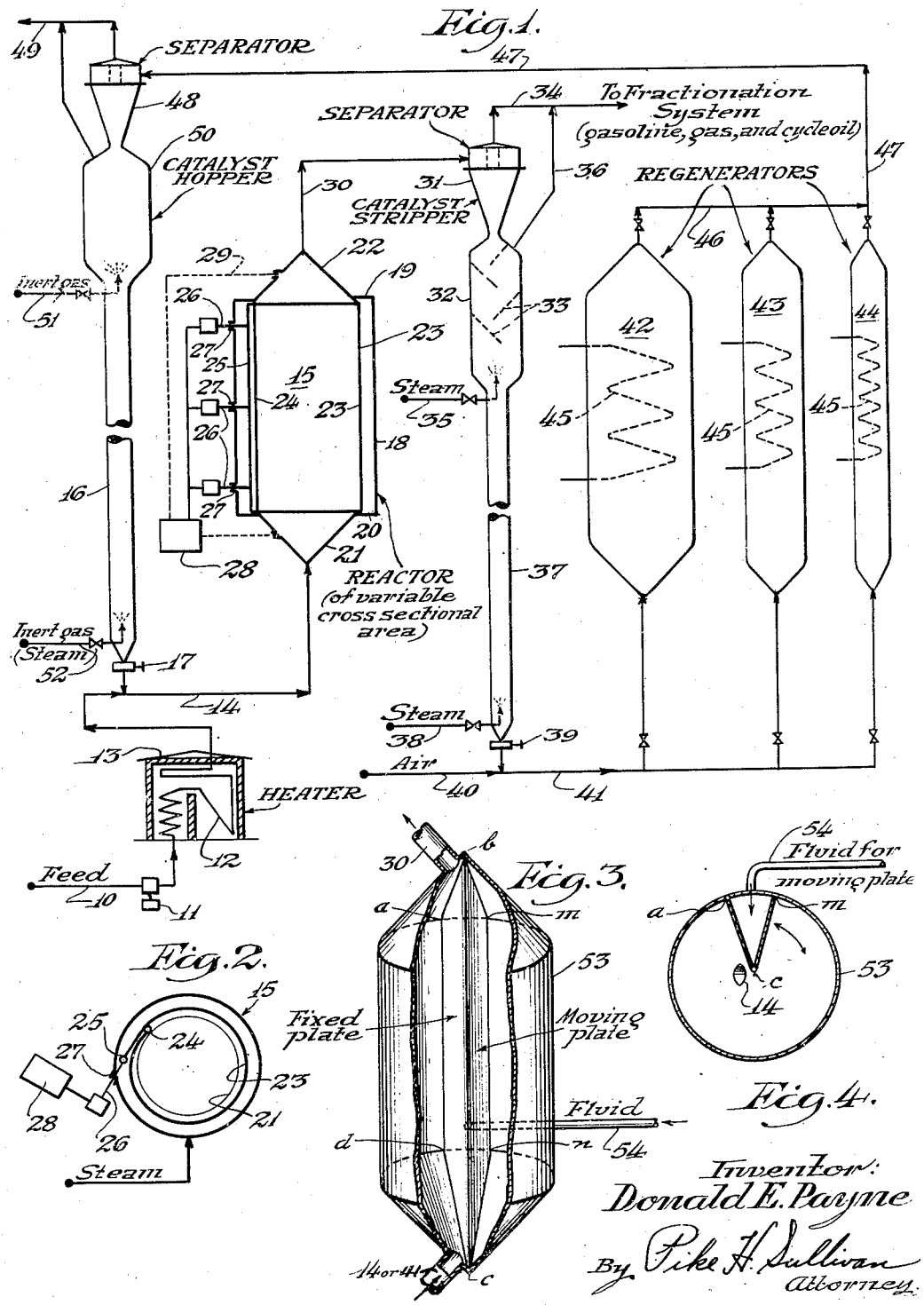

2,353,495

UNITED STATES PATENT OFFICE 2,353,495

CATALYTIC CONVERSION SYSTEM

Donald E. Payne, Chicago, Ill., assignor to Standard Oil Company, Chicago, Ill., a corporation of Indiana Application December 31, 1940, Serial No. 372,538

10 Claims. (Cl. 196—52)

This invention relates to catalytic conversion systems and it pertains more particularly to conversion systems of the so-called "fluid" type wherein a solid catalyst is employed for endothermic or exothermic reactions while suspended in an upwardly flowing gaseous or vapor stream. The invention is particularly directed to hydrocarbon conversion systems for the manufacture of high quality motor fuel.

In processes of catalytic cracking, hydrogenation, dehydrogenation, aromatization, reforming, isoforming, isomerization, alkylation, desulfurization, polymerization, etc. a hot vaporized hydrocarbon charging stock may be contacted with a solid catalyst while that catalyst is suspended in upwardly flowing reaction vapor stream. During the reaction the catalyst becomes coated with a carbonaceous deposit which impairs its catalytic activity. The coated catalyst may be separated from reaction vapors and suspended in another upwardly flowing stream containing controlled amounts of oxygen and thus regeneration may be effected by burning off the carbonaceous deposit while the catalyst is suspended in hot regeneration gas.

An important consideration in both the reaction and regeneration steps is the density of the suspended catalyst in the gaseous or vapor supported medium. It is essential in the reaction step that vapors contact a sufficient amount of catalyst for a sufficient period of time to effect the desired reaction. The amount of suspended catalyst in a reactor of given size is dependent upon the average density of the catalyst therein which in turn is critically dependent upon the superficial velocity of the supporting gas or vapor in said reactor. In the regeneration step it is essential that the coated catalyst be supplied with a sufficient amount of oxygen for effecting the necessary combustion and a sufficient amount of time must be allowed to permit the burning of the carbonaceous deposit. The amount of suspended catalyst in a regenerator of given size is likewise dependent upon the average density of the catalyst therein which in turn is critically dependent upon the superficial velocity of the regeneration gas in the regenerator. The problem in both reactor and regenerator design is to insure contact of the necessary amount of catalyst for the necessary amount of time with the necessary amount of gases or vapors or, in other words, to obtain the necessary catalyst density and vapor velocity in a reactor or regenerator of sufficient size for effecting the desired conversion.

The catalyst employed may be granular, powdered or pelleted solids of a particle size ranging from about 10 to 400 mesh, preferably about 200 to 400 mesh and preferably of fairly uniform size. When such catalyst is introduced at a fairly constant rate in the base of a vertical reactor wherein there is an upwardly flowing gas or vapor stream and the superficial velocity of said stream is varied it will be found that at high velocities the catalyst moves through the reactor at substantially the same velocity as the vapor stream— i. e., there is not a great tendency towards settling. At very low superficial vapor velocities through the reactor the catalyst may settle out of the vapors and assume a quiescent state. At intermediate vapor velocities the catalyst will be carried upwardly with the gas stream but there will be a pronounced tendency toward settling or slipping—i. e. the catalyst will move upwardly in the reactor at a much lower velocity than the supporting stream.

It has been found that with ordinary powdered catalyst ranging in particle size from about 200 to about 400 mesh the catalyst is uniformly distributed throughout the gas stream when the gas stream velocities are in excess of about 5 feet per second, the catalyst particles being suspended as individual particles in a continuous phase of gas. When the superficial gas velocity is decreased to about 2 feet per second the concentration of catalyst in the reactor rapidly increases and the catalyst takes on a "boiling" appearance in which "bubbles" of gas flow upwardly through a liquid like, "dense catalyst phase" in a manner similar to the upward flow of air through a body of water. This settled catalyst takes on the appearance of a new phase, an aerated catalyst phase which may have a density of 10 to 20 pounds per cubic foot. This dense phase becomes more pronounced and more clearly defined as the gas velocity is further decreased but if the gas velocity is sufficiently decreased portions of the catalyst will become quiescent and those portions of the dense phase will no longer behave as a liquid. In order to maintain a liquid-like "dense phase" condition the vapor velocity should be at least .2 foot per second and preferably about 1 to 2 feet per second. The velocity required for such dense phase conditions is dependent of course upon the particle size and weight of the catalyst, the diameter of the reactor and perhaps to some extent on the viscosity of the gas or vapor stream although the viscosity of this stream is not of as great significance as has heretofore been assumed.

It appears that when superficial vapor velocities in a reactor are so controlled as to produce a dense catalyst phase there is actually a rough interface between this lower dense catalyst phase and an upper rarefied phase. Apparently there is some force such as static electricity or surface energy which acts between closely adjacent particles and holds the powdered catalyst in the dense phase condition. The gas which bubbles through this dense phase sweeps catalyst particles therefrom into the upper gas phase and when such particles become dispersed therein they are subject to the laws of behavior as individual particles. With the introduction of catalyst into the dense phase at the same rate at which it is being removed from the top of the dense phase it is possible to maintain a constant level of catalyst in the reactor and to operate in a condition of dynamic equilibrium.

It might be assumed that with such low vapor velocities there would be a tendency toward classification, i. e., for the heavier catalyst particles to settle and escape withdrawal from the upper surfaces. It has been found, however, that with a superficial gas velocity of about ½ to 2 feet per second as much as 40% of 30 to 40 mesh particles can be added to the powdered catalyst without the occurrence of such classification. After equilibrium has been reached the heavier particles appear to be swept along in the eddies of relatively dense aerated catalyst and to be drawn from the surface of the dense phase at the same rate as they are being introduced thereto.

A very important feature of the dense phase operation is the uniform temperature which exists throughout all parts thereof. Here again the dense phase apparently behaves like a liquid in which there is sufficient turbulence and convection currents to obtain thorough and intimate mixing so that although gases may be introduced at a temperature of 950° F. the entire dense phase may be at a temperature that is very close to 925° F. when cracking is being effected in a dense phase reactor. Similarly, regeneration temperatures are uniform throughout the entire dense phase and relatively cold gases which are introduced with the oxygen may maintain any substantially uniform regeneration temperature by absorbing the exothermic heat as fast as it is liberated.

In a commercial conversion system employing the above described fluid type up-flow reactor for solid catalysts the size and cross-sectional area of the reactor can be determined for obtaining a particular vapor velocity, catalyst density and catalyst residence time in the reactor for any given catalyst, charging stock, and specific reaction conditions. In commercial operations, however, the catalyst, charging stock or reaction conditions may vary and a reactor designed for one set of conditions may be wholly unsatisfactory for another set of conditions. This is particularly true with respect to vapor velocities through the reactor. While the reactor is on-stream it is desirable to have a positive means for controlling vapor velocities through the reactor because such vapor velocities are a chief factor in determining catalyst density in the reactor and hence the total amount of catalyst which is retained in the reactor for effecting the desired conversion. An object of my invention is to provide a positive means for controlling gas or vapor velocity through a reactor without disturbing other parts of the conversion system. It is highly impractical for instance to alter feed rates in a continuous system because the pipe still coils, heat exchangers and, in fact the entire system is thus thrown out of balance. Increasing the amount of catalyst introduced into the reactor with the hydrocarbon vapors has no appreciable effect on the catalyst density in a reactor which is operating in dense phase condition because said density is primarily dependent upon the vapor velocity, and increasing the amount of catalyst introduced with incoming vapors will merely result in increasing the amount of catalyst discharged from the reactor—i. e. will lessen the catalyst residence time in a system which is in dense phase equilibrium.

In accordance with my invention I control catalyst density in the reactor by controlling the superficial vapor velocity therethrough and I control the superficial vapor velocity by varying the effective cross-sectional area of the reactor while it is on-stream and without any interruption or adjustment in any other part of the system. The simplest method of controlling vapor velocity in the reactor is to introduce thereto an excess of a relatively inert gas such as steam and to vary the amount of introduced steam to maintain the desired vapor velocity and catalyst density. While steam may be beneficial for some conversion processes it is detrimental to others and it involves a certain added expense. The preferred embodiments of my invention, therefore, involve mechanical means for varying the cross-sectional area of a reactor while that reactor is on-stream.

One method of mechanically regulating a cross-sectional reactor area is to provide a reactor with a split tubular lining, which perhaps may be better described as a sheet which is fixed at one end with means for drawing the other end around the fixed end to form a tube of variable effective diameter. In another embodiment of the invention I provide a tubular reactor with a fixed plate from the center to one side thereof and with another plate rotatable about the center and adapted by such rotation to effectively cut out a sector from the effective reactor space. By moving one plate toward or away from the other plate the size of this sector can be easily and quickly changed for modifying the effective cross-sectional area of the reactor. Another method of changing the effective cross-sectional reactor area is to provide a plurality of reactors of different cross-sectional areas connected for selective parallel flow. Various other methods of regulating effective cross-sectional area may, of course, be used.

The invention will be more clearly understood from the following detailed description and from the accompanying drawing which forms a part of this specification and in which Figure 1 is a flow diagram of my conversion system, Figure 2 is a horizontal section of the reactor illustrated in Figure 1, Figure 3 is an isometric view of a modified reactor provided with variable reactor dead space, and Figure 4 is a horizontal section of the modification shown in Figure 3.

Since the very object of the invention is to provide a system of such flexibility that it may be employed for a wide variety of processes, it will be obvious that the invention is not limited to any particular process. For the purpose of illustration, I will describe its application to a process of catalytic cracking for the conversion of gas oil into high quality motor fuel by means of a powdered catalyst of the silica-alumina type. Such catalyst may be prepared by acid treating bentonite or by depositing magnesia, alumina, or alumina and zirconia on silica gel. No invention is claimed in any catalyst per se and it should be understood that the selection of the catalyst will depend upon the particular process to be carried out in the apparatus. The cracking catalyst may have a particle size of about 200 to 400 mesh and may have an apparent bulk density before aeration of about .7, i. e. about 40 to 50 pounds per cubic foot. When aerated the catalyst may have a bulk density ranging from about 20 to 30 pounds per cubic foot and a desirable dense phase in a reactor may be about 5 to 20 pounds per cubic foot preferably about 10 to 15 pounds per cubic foot.

Gas oil from line 10 is forced by pump 11 through coils 12 of pipe still 13 to transfer line 14 and thence to reactor 15. Powdered catalyst from standpipe 16 is introduced into transfer line 14 in amounts regulated by star feeder or valve means 17. In this particular case the gas oil is heated to give a transfer line temperature of about 900 to 1050° F., preferably about 975° F. at a transfer line pressure of about atmospheric to about 50 pounds, preferably about 15 pounds per square inch. The catalyst is preferably at about the same temperature as the heated oil vapors and is introduced into these vapors in a ratio of about 5:1 to 1:1, preferably about 3:1 parts by weight catalyst per part by weight of oil. The catalyst reactor is designed to provide for an oil residence time in the reactor of about 2 to 40 seconds, preferably about 10 seconds, with a superficial vapor velocity therethrough of about .3 to 3 feet per second, preferably about 1.5 feet per second. The amount of catalyst in the reactor will be dependent upon the freshness or activity of the catalyst which, in turn, is dependent upon average catalyst residence time. For catalytic cracking the amount of catalyst in the reactor may be roughly expressed by the following formula:

$$T = at^{.5}$$

where "$T$" is tons of catalyst in the reactor per hundred barrels of stock charged to the reactor per hour, "$a$" is a constant ranging from 3 to .3, preferably about 1.2, and "$t$" is catalyst residence time in minutes. Thus for example, with a 1 minute catalyst residence time a 2,400 barrel per day plant will require about 3 to .3, preferably 1.2 tons or 2,400 pounds of catalyst in the reactor. With an average catalyst density in the reactor of about 12 pounds per cubic foot, the minimum reactor volume must be about 200 cubic feet.

With a 10 minute catalyst residence time a 2,400 barrel per day plant may require about 4 tons of catalyst in the reactor. With an average catalyst density in the reactor of 12 pounds per cubic foot the reactor volume must be at least about 650 to 700 cubic feet. For obtaining superficial vapor velocity of about 2 feet per second in the reactor the diameter of this reactor must be about 9 or 10 feet. Hence with due allowance for lower catalyst densities in the upper part of the reactor such a reactor may be a cylindrical chamber about 9 or 10 feet in diameter and about 20 feet high.

It is highly desirable to maintain a dense or liquid like phase in the reactor and to pass the reaction vapors through this dense phase much as air would pass upwardly through a body of water. At certain critical vapor velocities, usually about .3 to 3 feet per second, there appears to be a rough interface between the dense phase in the lower part of the reactor and a light phase at the top of the reactor. Evidently some force, such as static electricity or surface energy acts between closely adjacent catalyst particles and holds these particles in aerated dense phase conditions. From the surface of said dense phase eddies of the reaction vapors may sweep catalyst particles into the lighter upper phase and disperse them as discrete particles subject to the laws of behavior of individual particles in gas or vapor suspension. Thus, under conditions of equilibrium, catalyst particles are "boiled out" of the dense phase and withdrawn from the reactor at the same rate as they are being introduced into the reactor with reaction gases.

In order to operate the reactor under optimum dense phase conditions it is necessary to critically control vapor velocities in the reactor. I effect this control by varying the effective cross-sectional area of the reactor so that an optimum cross-sectional area may be used for any particular catalyst or conversion process or operating conditions and so that the dense catalyst phase may be held at a constant level in a conversion without unbalancing any other part of the conversion system.

The reactor illustrated in Figs. 1 and 2 consists of a cylindrical vessel 18 provided with annular top and bottom plates 19 and 20, the latter being secured to a conical distributor 21 and the former to a conical collector 22. A metal sheet 23 extends between the annular top 19 and annular bottom 20 of the reactor this sheet being curved to form an inner cylinder which defines the actual reaction chamber space. One end 24 of sheet 23 is welded or otherwise secured in the chamber in fixed position. The other end 25 is connected to rods 26 extending through suitable packing glands 27 and provides a means for moving the free end 25 toward and away from fixed end 24.

The amount of catalyst in the reactor may be determined by difference in pressure in the top and bottom of the reactor—for example, by means of a simple manometer. By pushing rods 26 inwardly the effective reactor cross-section is increased and the vertical velocity of up-flowing vapors is correspondingly decreased so that the amount of catalyst in the reactor is increased. By pulling rods 26 outwardly the effective cross-sectional area of the reactor is decreased giving a corresponding decrease in catalyst density in the reactor. Positive driving means 28 may be employed for automatically forcing rods 26 inwardly or outwardly in accordance with pressure differential across the reactor which may be indicated by a manometer or other suitable means 29. The amount of catalyst is, of course, dependent upon reactor volume as well as average catalyst density in the reactor so that the pressure differential controlled driving means must be designed to take into account the change in reactor volume as well as pressure differential across the reactor.

The reaction products and suspended catalyst leave the top of the reactor through line 30 and are introduced into cyclone separator 31 from which separated catalyst passes to the top of hopper or stripper column 32 provided with baffles 33. The gases from separator 31 may be introduced by line 34 to a conventional fractionation system for separating gasoline, gas and hydrocarbons heavier than gasoline, the latter being commonly referred to as "cycle oil."

Steam or other inert gas is introduced through line 35 to effect the stripping and the stripped products are removed through line 36 to line 34. The stripped catalyst then passes to standpipe or catastat 37 which may be a tower about 50 to 100 feet high and about 3 or 4 feet in diameter. The catalyst in this tower is aerated by steam or other inert gas introduced through line 38 at such a rate as to maintain the catalyst in fluent condition, the superficial velocity of the steam in the tower being about .02 to .2 feet per second.

Catalyst is withdrawn from the base of the tower through star feeder or slide valve 39, picked up by air introduced through line 40 and passed by line 41 into one or more regenerator chambers 42, 43 or 44. The diameter of chamber 43 may be twice that of 44 and the diameter of 42 may be twice that of 43. By proper selection of chambers a wide variety of effective cross-sectional areas may be obtained and in any particular instance a selection will be made to provide for a superficial gas velocity in the regenerator of about .2 to 2, preferably about 1 to 1½ feet per second. It should be understood, of course, that the regenerator may be a chamber of the same type as reactor 15 and the cross-sectional area may be controlled in the manner described in connection therewith. Cooling gases may be added with the air introduced by line 40 or may be introduced directly into the regenerator chambers providing, of course, that the cross-sectional area of the chambers is properly selected so that the vapor velocity will be maintained within the critical limits. Temperature control may likewise be effected by cooling a part of the regenerated catalyst and returning the relatively cooled catalyst to chambers undergoing regeneration. In fact, cooling tubes may be used in the regeneration chamber itself as indicated by coils 45 for insuring that the regeneration temperature will not exceed about 1050° F.

Regeneration gases and suspended regenerated catalyst are withdrawn through line 46 and line 47 to cyclone separator 48 from which regeneration gases are vented through line 49 to suitable waste heat boilers or power recovery means. It will be understood that a number of cyclone separators may be employed in series for effecting separation or that other conventional separation means may be employed in place thereof.

From separator 48 the regenerated catalyst falls into hopper 50 which is aerated by an inert gas introduced by line 51. The catalyst then falls into standpipe or catastat 16 which is aerated by an inert gas introduced through line 52.

In connection with Figure 1 I have illustrated two different means for regulating effective cross-sectional reactor area and have indicated that either of these means may be employed for either the reactor or the regenerator. It should be understood that other mechanical means may likewise be used for accomplishing this purpose. For instance, reaction chamber 53 (Figures 3 and 4) may be provided with a fixed radial plate a, b, c, d, and a movable radial plate m, b, c, n, m. The movable plate may rotate about axis b, c and thus cut out a sector b, a, m (Figure 3) from the circular cross-sectional area of the reactor. Plate m, b, c, n may be rotated by mechanical means or it may be rotated by fluid pressure, a suitable operating fluid being introduced or withdrawn through line 54. Thus if the vapor velocity in the reaction chamber becomes too high it may be lowered by moving the movable plate more closely to the fixed plate and if it is desired to obtain a smaller cross-sectional area of reactor space the movable plate may be moved away from the fixed plate.

While I have described the regulation of cross-sectional reactor area in accordance with the pressure differences in the top and bottom of the reactor it should be understood that other controls may be used. For instance, the amount of catalyst discharged from cyclone separator 31 may be larger than the amount of catalyst introduced through line 14, thus indicating that vapor velocities in the reactor are too high. The effective cross-sectional area of the reactor may then be reduced accordingly to keep the amount of catalyst discharged from separator 31 equal to the catalyst introduced through line 14. Other methods of control will be apparent to those skilled in the art from the above description.

I claim:

1. The method of maintaining a critical vapor velocity in an up-flow reactor of fixed external dimensions for maintaining powdered solid catalyst in dense phase condition in upflowing gas or vapor, which method comprises varying the effective cross-sectional area of said reactor without changing the external dimensions thereof.

2. In a catalytic conversion system, an up-flow reactor of fixed external dimensions, means for introducing powdered catalyst and a suspending gas at the base of said reactor, means for withdrawing suspended catalyst and a gas from said reactor and means for regulating the effective cross-sectional area of said reactor without changing the external dimensions thereof for maintaining a superficial vapor velocity therein within the approximate range of .3 to 3 feet per second.

3. The apparatus of claim 2 wherein the means for varying cross-sectional area compris an expansible tube.

4. The apparatus of claim 2 wherein the means for varying cross-sectional area comprises a fixed plate in said reactor and a movable plate therein and means for moving said fixed plate with respect to said movable plate.

5. In a catalytic conversion apparatus an up-flow reactor, means for introducing powdered catalyst and a supporting gas at the base of said reactor, means for withdrawing gas and suspended catalyst from said reactor and movable means within said reactor for varying the effective cross-sectional area thereof.

6. In a hydrocarbon conversion system wherein charging stock is vaporized and heated to a conversion temperature and introduced at the base of an up-flow reaction zone together with powdered catalyst of less than 200 mesh particle size, the method of controlling the amount of catalyst which is contacted by said vapors in said reaction zone which method comprises maintaining a superficial vapor velocity in said reaction zone of about .3 to 3 feet per second whereby a dense catalyst phase is obtained, and regulating the effective cross-sectional area of said reaction zone while the system is on stream to obtain a vapor velocity in said range at which the amount of catalyst discharged from the reactor is the same as the amount of catalyst charged thereto.

7. In a catalystic conversion system wherein hydrocarbon vapors are subjected at conversion temperatures and pressure to the action of a powdered catalyst having a particle size less than 200 mesh while said catalyst is contacted with upflowing reaction vapors as a dense phase having a bulk density in the general vicinity of 10 to 30 pounds per cubic foot in a reaction zone and wherein powdered catalyst is continuously introduced into said zone and powdered catalyst and vapors are continuously withdrawn from said zone so that there may be a tendency toward an increase or decrease in the amount of catalyst in the reaction zone while said zone is on-stream, the method of maintaining a substantially constant amount of catalyst in the reaction zone which method comprises ascertaining the pressure differential between the bottom and top of said reaction zone, increasing the vertical vapor velocity in said reaction zone without substantially changing the hydrocarbon vapor charge rate when the pressure differential exceeds a predetermined maximum and decreasing the vertical vapor velocity in the reaction zone without substantially changing the hydrocarbon vapor charge rate when the pressure differential falls below a predetermined minimum.

8. The method of claim 7 wherein the increasing and decreasing of vapor velocities in the reaction zone is effected by varying the effective cross-sectional area of the reaction zone without changing the outside dimensions thereof.

9. The method of claim 7 wherein the increasing and decreasing of vertical vapor velocities in the reaction zone is effected by introducing steam with reaction vapors and varying the amount of introduced steam in accordance with said pressure differential.

10. The method of claim 7 wherein the catalyst is a cracking catalyst and wherein the amount of catalyst in the reaction zone is expressed by the following formula:

$$T = at^{.5}$$

where "T" is tons of catalyst in the reaction zone per 100 barrels of liquid hydrocarbon stock charged to the reaction zone per hour, "$a$" is a constant within the approximate range of .3 to 3 and "$t$" is catalyst residence time in the reaction zone expressed in minutes.

DONALD E. PAYNE.